G. C. CHERBONNIER.
RATCHET AND PAWL ARRANGEMENT FOR DUMPING CARS.
APPLICATION FILED JAN. 8, 1916.

1,256,110.

Patented Feb. 12, 1918.
2 SHEETS—SHEET 1.

INVENTOR
GEORGE C. CHERBONNIER
BY J. H. Gibbs
ATTY.

G. C. CHERBONNIER.
RATCHET AND PAWL ARRANGEMENT FOR DUMPING CARS.
APPLICATION FILED JAN. 8, 1916.

1,256,110.

Patented Feb. 12, 1918.
2 SHEETS—SHEET 2.

INVENTOR
GEORGE C. CHERBONNIER
BY F. H. Gibbs
ATTY.

UNITED STATES PATENT OFFICE.

GEORGE C. CHERBONNIER, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

RATCHET-AND-PAWL ARRANGEMENT FOR DUMPING-CARS.

1,256,110.

Specification of Letters Patent. Patented Feb. 12, 1918.

Application filed January 8, 1916. Serial No. 71,054.

*To all whom it may concern:*

Be it known that I, GEORGE C. CHERBONNIER, residing at St. Louis, Missouri, and being a citizen of the United States, have invented certain new and useful Improvements in Ratchet-and-Pawl Arrangements for Dumping-Cars, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof will occur to persons skilled in the art.

An object of the present invention is to provide a ratchet and operating lever having a pawl which an operator may reverse with perfect ease to rotate the ratchet in either direction, it being impossible however for the pawl to be spun or accidentally knocked from one operative position to the other.

It is also an object to have the pawl characterized by an ability to engage the ratchet by gravity regardless of the direction in which the shaft is being rotated. Accidental reversal of the pawl is so guarded against that it is impossible for such an occurrence to unintentionally take place removing all consequent danger to the mechanism and the operator.

Other advantages will appear hereinafter, all being included in the conception herein disclosed.

Figure 5:
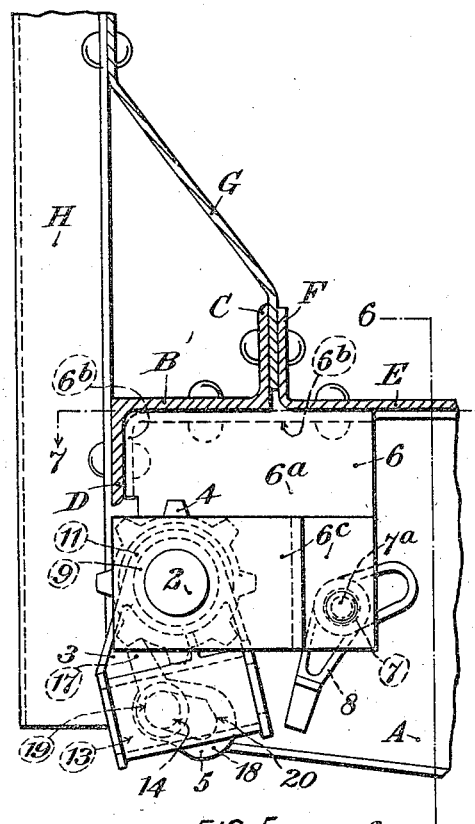
Fig. 5 is a vertical section on the line 5—5 of Fig. 1, the ratchet and pawl being shown in the same positions they occupy in Fig. 3, but being viewed in the opposite direction.
Figure 6:
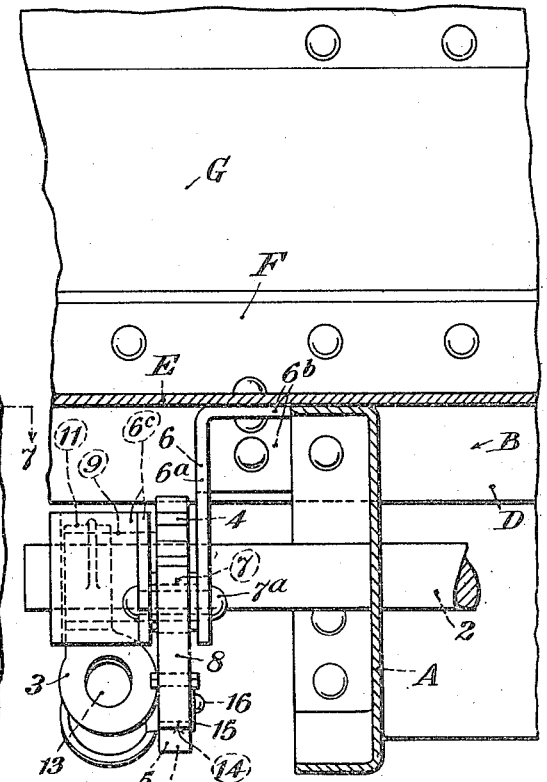
Fig. 6 is a vertical section taken on line 6—6 of Fig. 5.
Figure 7:
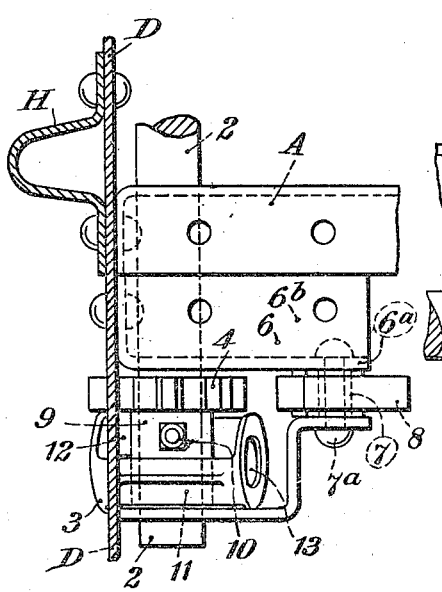
Fig. 7 is a horizontal section taken on the line 7—7 of Fig. 5 and looking in the direction of arrows.
Figure 8:
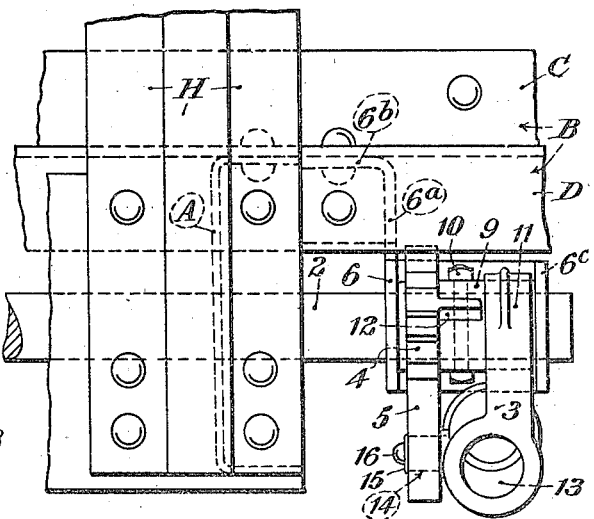
Fig. 8 is an enlarged side view of the mechanism shown in Fig. 1.

Referring to the drawings, the pawl and ratchet mechanism has been shown as applied to a general service car which is provided with bolsters A upon the outer ends of which are mounted side sills B here shown as being Z bars having vertically disposed inner and outer flanges C and D, respectively. As is usual, cross bearers will be interposed between the bolsters and assist in supporting the said side sills. As shown particularly in Figs. 5 and 6, floor sheets E have portions resting upon the bolsters A, and these sheets ordinarily extend from the car end to the bolster, being illustrated as having upturned flanges F paralleling the inner vertical flanges C of the side sill B.

Interposed between flanges C and F is the bottom of a car side sheet G which extends upwardly and outwardly in its lower portion and thereafter continues upwardly toward its top. Side stakes H lie against the upper vertical portion of side sheets G and extend downwardly being connected to the downturned flange D of side sill B and extending therebelow for a distance substantially equal to the outer end face of bolster A.

Shown as being positioned somewhat below side sill B is a winding-shaft 2 upon which is adapted to be wound chains 1, which chains draw the car doors (not shown) to their closed positions and are unwound to permit such doors to assume lading discharging positions. Winding-shaft 2 extends longitudinally of the car and for a short distance beyond the bolster A, and may be supported in any suitable manner intermediate the bolsters but beyond the latter a plate 6 serves as a bearing for said shaft.

Plate 6 is best disclosed in Figs. 5 to 8 inclusive, and comprises a vertical shaft-supporting portion $6^a$ and a horizontally disposed flange 6b which lies against the underside of side sill B and extends for a short distance underneath the end floor plate E, being riveted to the web of side sill B and said floor plate.

Flange 6b of plate 6 also has its outer end downturned and riveted to depending flange D of side sill B.

In conjunction with another plate 6c which is Z-shaped, plate 6 forms a housing for the shaft-operating mechanism, these plates being separated by a bushing 7 upon which is pivotally mounted a locking pawl 8, the plates 6 and 6c being connected by a rivet 7a which passes through bushing 7.

In assembling, before plate 6c is placed in position a ratchet wheel 4 provided with a sleeve 9 is slipped over the shaft with its sleeve projecting outwardly, that is, toward the end of the car, a bolt or rivet 10 being passed through apertures in said sleeve 9 and the portion of shaft 2 which it surrounds, firmly attaching and locating the ratchet wheel 4. A socket casting 3 is then put into place by having its hub 11 slipped over sleeve 9 of the ratchet device 4 through which shaft 2 extends, said hub 11, and consequently the entire socket casting 3, being properly positioned longitudinally of sleeve 9 by lugs 12 which keep the socket casting away from the teeth of the ratchet wheel 4. Side sill B, it is therefore seen, constitutes a main supporting member for the connected plates 6 and 6c.

Casting 3 is provided with a cylindrical portion perpendicular to the axis of hub 11 and which is made hollow to form a socket 13 into which a crowbar or other lever may be inserted for the purpose of oscillating socket casting 3 to cause a pawl 5 to move ratchet wheel 4 to rotate winding-shaft 2 either in one direction or the other to wind or unwind the chains 1.

Pawl 5 is carried by socket casting 3 by being mounted upon a cylindrical lug or stud 14 which serves as a pivot for said pawl. Lug 14 is slightly longer than the thickness of the pawl which is slipped over it and is retained thereon by a washer 15, in turn held in place by a rivet 16, the difference in the length of the lug 14 and the thickness of pawl 5 establishing sufficient clearance to allow the pawl to rotate freely about said lug or pivot 14.

Pawl 5 comprises a tooth 17, a body portion containing a slot 21 terminating in bearings 19 and 20, which are in the form of semi-cylindrical slot ends, and a heavy butt portion 18. If it is desired to wind the chains upon shaft 2 and so raise the doors (not shown), pawl 5 may be turned in a clockwise direction, as viewed in Fig. 4, and slid to engage its bearing 19 with pivot 14, so as to be shifted from the position there shown to that shown in Fig. 2 when said pawl 5 will be supported by having its bearing 19 in engagement with lug 14 extending from socket 13, the heavy butt 18 causing the tooth 17 to engage the teeth of ratchet wheel 14 whenever the socket casting 3 is in a position suitable for an operator to apply his power, such position being shown in Fig. 2.

Figure 1:
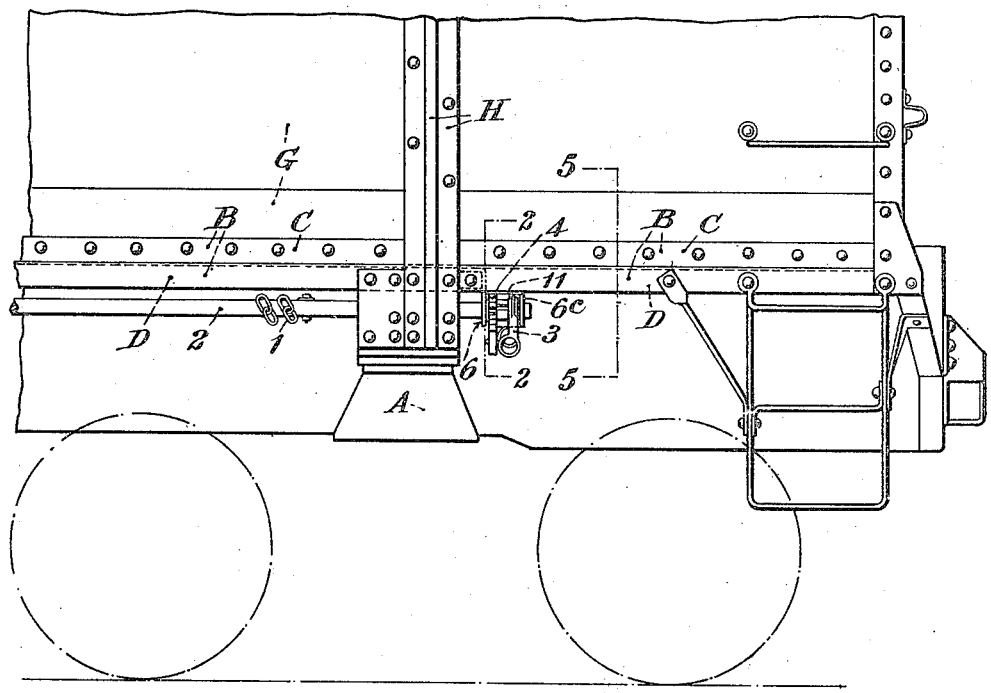
Figure 1 is a side elevation of an end portion of a car showing a chain-winding shaft with the ratchet mechanism applied.
Figure 2:
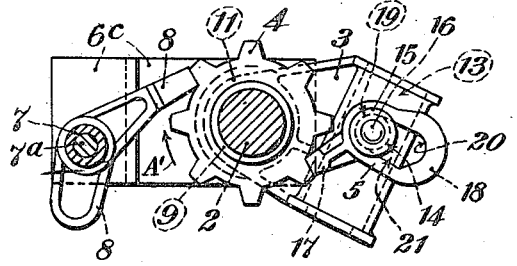
Fig. 2 is a vertical section on the line 2—2 of Fig. 1 and shows the socket casting and pawl in position to wind the chains on the shaft.

That shaft 2 may not have reverse rotative movement between the oscillations of socket casting 3 as the operator oscillates the latter, pawl 8 is swung into the position shown in Fig. 2 preventing such shaft retroaction, and the repeated or intermittent power applications of the operator will result in the lever socket and pawl 5 advancing the shaft in the direction indicated by the arrow A′, as viewed in Fig. 2, until the doors have been raised to closed positions by the winding up of chains 1 on shaft 2.

Figure 4:
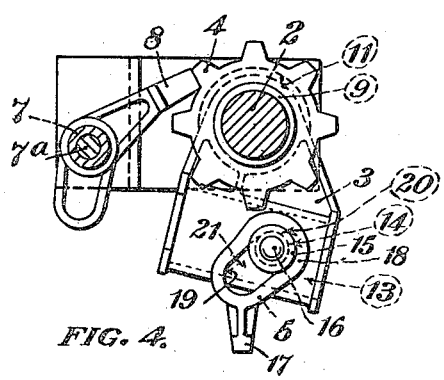
Fig. 4 is another similar section but showing the operating pawl disengaged from the ratchet.

After the raising of the doors, pawl 8 is permitted to remain in the position shown in Fig. 2, and the operator removes his crowbar or other lever and disengages pawl 5 from ratchet wheel 4, placing it in the position shown in Fig. 4. Bearing 20 of pawl 5 then embraces pivot lug 14 and the pawl hangs in the depending position illustrated.

Figure 3:
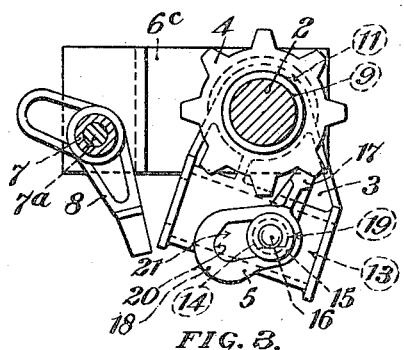
Fig. 3 is a similar view but showing the parts in position to start the release of the shaft.

There being occasion to open the doors, necessitating the unwinding of chains 1 from shaft 2, pawl 8 is thrown to the position shown in Fig. 3 and pawl 5 is reversed by rotating it contra-clockwise about pivot lug 14 with pawl bearing 20 in engagement therewith, and then sliding said pawl until pawl bearing 19 is in engagement with pivot lug 14, bringing it substantially into the position shown in Fig. 3, which position it will assume during the initial oscillating of socket casting 3. The tooth 17 of said pawl 5 thereafter will tend to be kept in engagement with the faces of the teeth of the ratchet wheel 4 opposite those faces it engaged during the winding operations because of the heavy butt 18.

With this relationship between pawl 5 and ratchet wheel 4, the inertia of the door-operating mechanism may be overcome by the operator again inserting a crowbar or other lever into socket 13 of socket casting 3, and lifting upon the same to produce an intermittent contra-clockwise rotation of ratchet wheel 4, after which the weight of the doors and that of the lading will cause the former to drop by gravity to lading-discharging positions. This preliminary application of power to the ratchet wheel 4 is of particular value during the winter season, when the car parts are exposed to the influences of accumulated ice, tending to lock the mechanism against movement.

From the foregoing it is evident that the operator may readily adjust the pawl 5 to engage either one side or the other of the teeth of ratchet wheel 4, according to which direction he desires to rotate winding shaft 2. After such adjustment the pawl will be caused to engage said ratchet wheel teeth by gravity, due to the weight of butt 18 of the pawl, provided the operator has swung socket casting 3 to a suitable position to apply his power thereto through a crow bar or other operating lever. Socket casting 3 will be moved to the position illustrated in Fig. 2 to rotate shaft 2 in one direction, and to the position depicted in Fig. 3 to rotate it in the reverse direction.

When pawl 5 is not in use it depends from socket casting 3, as previously stated, and said casting is at that time suspended as shown in Fig. 4. In this position both the casting and pawl are located inwardly from the outer limit of the car side stakes, and are unobstructive. If said pawl, while in either of its ratchet wheel-operating positions, be struck by the ratchet teeth, or for any other reason tends to rotate on its bearing 19 about pivot lug 14, the butt 18 will strike the ratchet wheel but because of its rounded outline will not positively engage the teeth. Also the pawl 5, in either of its ratchet wheel-engaging positions, can only be reversed to the opposite ratchet-wheel-engaging position by being intentionally caused to make almost a complete revolution, during which it must slide on pivot lug 14 for the length of its slot 21, i. e., from bearing 19 to bearing 20, and back again. This tortuous movement makes it impossible for an accidental reversal of the pawl to occur, avoiding the consequent danger to the mechanism and the operator.

Pawl 15 is mounted to be unbalanced in any of its positions, as shown in Figs. 2, 3 and 4. As a result, when in driving relation with the ratchet wheel to drive the same in either direction, it automatically adjusts itself to the ratchet wheel teeth. When out of use, it hangs unbalanced in unobstructive position.

What I claim is:

1. In combination, a passive member, a movable toothed member connected therewith, and a pawl adapted to actuate the same in opposite directions, said pawl being manually reversible by endwise rotative and longitudinal sliding movement thereof.

2. In combination in a railway car, a passive member, a movable toothed member for operating the same, and a slidable pawl adapted to turn about a pivotal axis and to actuate said toothed member in a plurality of directions, said pawl requiring an independent action altering of its relation to said axis to actuate said member in different directions.

3. In combination, a passive member, a movable toothed member connected therewith, an oscillatory member and a pawl rotatively mounted thereon having a single toothed place adapted to drivingly engage said toothed member and to actuate it in opposite directions, said pawl being reversible by slidable and rotative movement parallel with the sides of said toothed member.

4. In combination, a door-controlling shaft, a ratchet wheel connected therewith, an oscillatory member and a slidably reversible pawl operable thereby having an end adapted to actuate said ratchet wheel in opposite directions and another end liable to contact with the ratchet wheel teeth during reversal of said pawl but having a contour preventing establishment of a driving relation therewith.

5. In combination, a door-controlling shaft, a ratchet wheel connected therewith, a member adapted to swing about said shaft and a reversible pawl operable thereby adapted to actuate said ratchet wheel in opposite directions, said pawl being reversible by rotative and sliding movement, the rotative movement in the aggregate exceeding a half-revolution about an axis passing through said pawl.

6. In combination, a revoluble shaft, a ratchet wheel connected therewith, an oscillatory member and a reversible pawl operable thereby having a lip and adapted to be slid and turned in the plane of sliding to reversed positions wherein said lip automatically engages said ratchet wheel to actuate it in opposite directions.

7. In combination, a mounted shaft, a ratchet wheel and an oscillatory member slipped onto the shaft while it is mounted and to have therewith nested portions, mechanically combined stationary plates protectively embracing said nested members one plate holding said oscillatory member from withdrawal, and a slidably reversible pawl carried by said oscillatory member adapted to drive said ratchet wheel and shaft in opposite directions.

8. In combination, nested members comprising a mounted shaft, a ratchet wheel and an oscillatory member slipped onto the mounted shaft, said wheel being rotatable therewith, plates housing said nested members one plate being anchored against movement and another connected therewith and retaining in place the oscillatory member, the latter having a socket extension projecting beyond said plates to receive an operating lever, and a slidably reversible pawl carried by the oscillatory member adapted to oppositely rotate the ratchet wheel.

9. In combination, a main supporting member, connected plate metal members rigidly united therewith having spaced portions provided with bearings, a shaft extending through the bearings, a shaft-driving ratchet wheel and a lever-receiving oscillatory member through which said shaft passes confined between said spaced plate portions, and a slidably reversible pawl operable by the oscillatory member to oppositely drive said ratchet wheel.

10. In combination in a railway car, a winding shaft, a driving ratchet wheel therefor, an oscillatory member comprising a hub portion surrounding said shaft and a socket portion adapted to receive an operating lever, and a slidably reversible pawl mounted on said socket portion and adapted to be turned without transverse movement in its path of actuating travel to cause one of its ends to engage opposite sides of the teeth of said ratchet wheel to drive the same in one direction or the opposite.

11. In combination in a railway car, a winding shaft, a driving ratchet wheel therefor, means for driving said ratchet wheel in opposite directions including an oscillatory member having a shaft-surrounding hub, a housing for said ratchet wheel and hub comprising separate members holding said ratchet wheel and oscillatory member against separation, and a connector interposed between said separate members, and a retroaction pawl mounted on said connector and adapted to engage said ratchet wheel at will.

12. In combination in a railway car, a door-controlling shaft, means for driving the same in opposite directions including a ratchet wheel, a housing for said shaft-driving means comprising a shaft-bearing member, an inclosing member and a connector joining said members, and a retro-action pawl mounted on said connector and adapted to engage said ratchet wheel, said inclosing member forming another shaft bearing.

13. In combination in a railway car, a car sill, a door-controlling shaft adjacent said sill, means for driving said shaft in opposite directions including a ratchet wheel, a housing for said shaft-driving means comprising a shaft-bearing member connected with and extending transversely of said sill and an inclosing member joined thereto, and a retroaction pawl supported by said housing and adapted to engage said ratchet wheel.

14. In combination in a railway car, a door-controlling shaft, a shaft-driving ratchet wheel having a sleeve, a member out of alinement with the periphery of said wheel rockably engaging said sleeve and provided with a socket adapted to receive an operating lever, and a pawl pivotally mounted on said rockable member and reversible by a combined sliding and edgewise rotary movement to adapt it to cause one of its ends to drive said ratchet wheel in either direction.

15. In combination in a railway car, a door-controlling shaft, a shaft-driving ratchet wheel having a shaft-surrounding sleeve, a rockable member out of alinement with the periphery of said wheel rotatively mounted on said sleeve and provided with a socket adapted to receive an operating lever, and a pawl pivotally mounted on said rockable member and reversible by a combined sliding and edgewise rotary movement and caused by gravity to have one of its ends engage said ratchet wheel to adapt it to drive the same in either direction.

16. In combination in a railway car, a door-controlling shaft, a shaft-driving ratchet wheel having a shaft-surrounding sleeve, a rockable member out of alinement with the periphery of said wheel rotatively mounted on said sleeve and provided with a socket adapted to receive an operating lever, means spacing said rockable member from said ratchet wheel and a reversible pawl pivotally and slidably mounted on said rockable member adapted to drive said ratchet wheel in either direction.

17. In combination, a driving ratchet wheel, an oscillatory member, a reversible pawl provided with a slot, and a pivot on said oscillatory member extending into said slot and adapted to support said pawl in a plurality of positions to drive said ratchet wheel in opposite directions.

18. In shaft driving mechanism, a reversible pawl having an extended pivot-bearing.

19. In combination, a revoluble member, a ratchet wheel rotatable therewith, an oscillatory member, and a pawl pivotally hung thereon to be unbalanced and swung in a curved path, said pawl being slidably reversible to oppositely drive said ratchet wheel.

20. In combination, a revoluble member, a ratchet wheel rotatable therewith, pawl-operating means and a pawl hung thereon slidably reversible into unbalanced positions to drive said ratchet wheel in opposite directions and movable into an unbalanced position to remain out of engagement with said wheel.

21. In combination, a shaft, a shaft-rotating ratchet wheel, an oscillatory member provided with a pivot and a pawl with an elongated slot receiving said pivot, said pawl being slidably reversible into unbalanced positions to drive said ratchet wheel in opposite directions.

22. In combination, a ratchet wheel, an oscillatory member socketed to receive an operating lever and provided with a pivot movable substantially parallel with the ratchet wheel periphery, and a pawl having a slot receiving said pivot and slidably reversible on the pivot into unbalanced positions to oppositely drive said ratchet wheel.

23. In combination, a ratchet wheel, an oscillatory member provided with a pivot, and a pawl having a slot entered by said pivot and formed with a plurality of pivot bearings, said pawl being reversible to positions to oppositely drive said ratchet wheel and requiring transference from one of said bearings to another and back to the bearing it left to be reversed.

24. In combination, a toothed member, an oscillatory member provided with a pivot, and a reversible pawl having a single tooth-driving portion and a slot entered by said pivot, said pawl being rotative to direct its tooth-driving portion to engage opposite sides of the teeth of said toothed member and requiring sliding transversely of said pivot while being reversed.

25. In combination, a toothed member, an oscillatory member provided with a pivot, and an unbalanced pawl having a single tooth-driving portion, bearings and a slot establishing communication therebetween, said pivot entering said slot, said pawl being reversible by rotative and sliding movement from and to one of said bearings to be positioned to oppositely drive said toothed member and to another bearing into position unaffecting said toothed member.

In witness whereof I have hereunto set my hand in the presence of two witnesses.

GEORGE C. CHERBONNIER.

Witnesses:
OSCAR HOCHBERG,
RODNEY BEDELL.

Copies of this patent may be obtained for five cents each, by addressing the "Commissioner of Patents, Washington, D. C."